3,306,656
AUTOMOTIVE TRUNK LID SUPPORT
Dennis R. Hughes, 10606 S. Campbell Ave.,
Chicago, Ill. 60655
Filed July 28, 1965, Ser. No. 475,398
6 Claims. (Cl. 296—76)

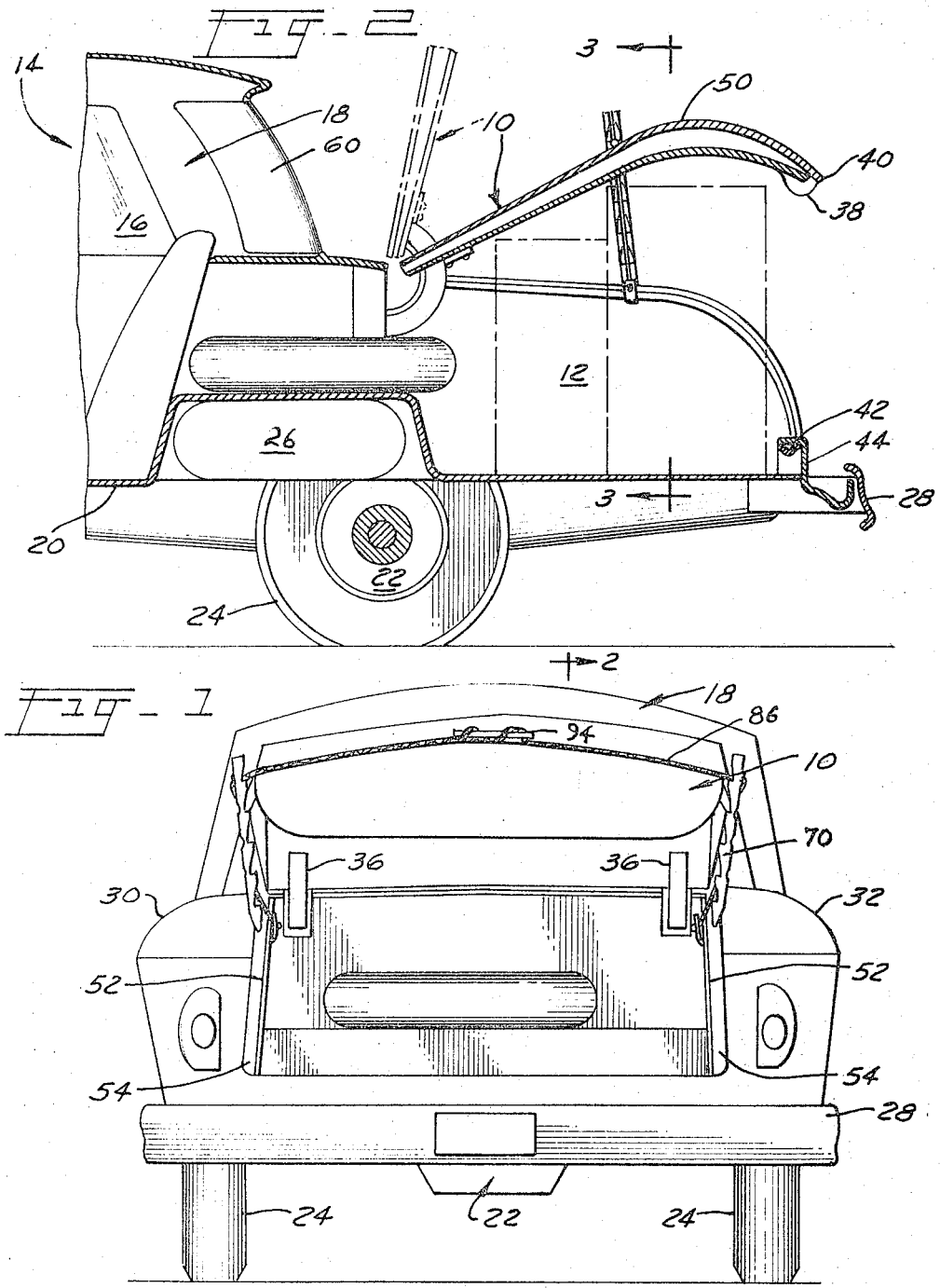

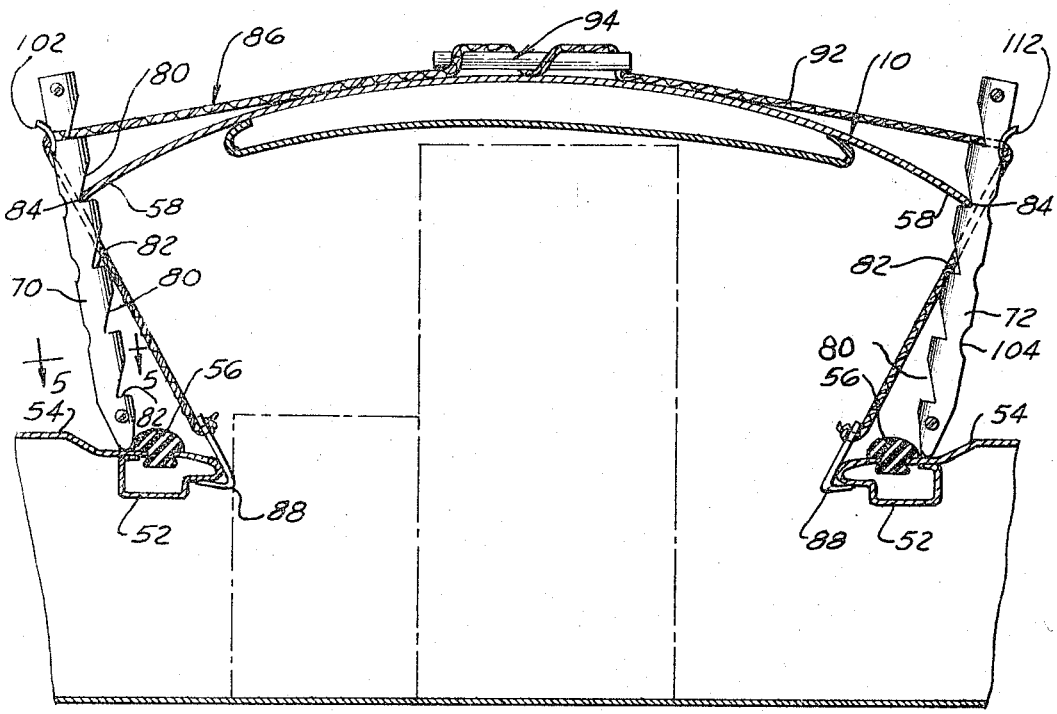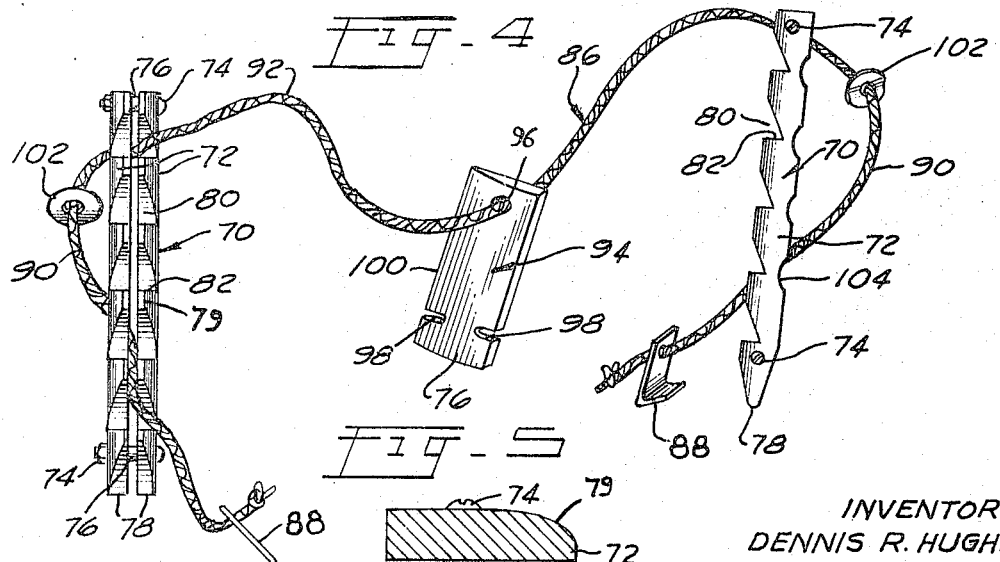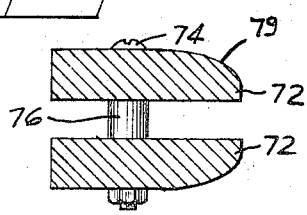

The present invention relates to a novel automotive trunk lid support which is adapted to maintain the hinged closure lid of an automobile trunk or luggage compartment in any desired partially open position.

It is desirous in many instances to maintain an automotive trunk lid open when transporting or hauling articles which are long or bulky as, for example, when hauling lumber, step ladders, Christmas trees, television sets and the like. In order to maintain the trunk lid from swinging up and down and damaging the articles being hauled, it is necessary that some device be employed for holding the lid against such swinging movement, preferably in its position of smallest trunk opening possible with the lid resting securely on the article or articles being hauled. Accordingly, it is the principal object of the present invention to provide a new and useful support which is capable of being operatively applied to practically any automotive trunk or luggage compartment regardless of whether the same be associated with a recent model automobile or an older model, and which is readily adjustable and capable of being easily installed, to the end that the trunk lid will be held in its position of minimum opening as determined by the dimensions of the bulky articles in the trunk.

It is a further object of the invention to provide a trunk lid support which, when operatively installed in any given situation, serves to provide anchorage for the trunk lid at widely and laterally spaced regions, thus equalizing the involved stresses between the trunk lid hinges to the end that an appreciable degree of stability will be attained.

The provision of an automotive trunk lid holder which requires no tools for its installation; one which does not require the drilling of holes or other cutting of metal in the body of the associated automobile; one which in no way damages or defaces the automobile body; one which when not in use is foldable in a compact manner so that it will consume but little storage space; one which may be manufactured at a low and reasonable cost; and one which is otherwise adapted to perform the services required of it, are further desirable features which have been borne in mind in the production and development of the present invention.

In the accompanying two sheets of drawings forming a part of this specification, one illustrative embodiment of the invention is shown.

In these drawings:

FIG. 1 is a rear elevational view of an automobile having a trunk lid support embodying the invention operatively applied thereto;

FIG. 2 is a vertical longitudinal sectional view taken on the line 2—2 of FIG. 1;

FIG. 3 is a vertical transverse sectional view taken on the line 3—3 of FIG. 1;

FIG. 4 is a perspective view illustrating the structural details of the improved trunk lid support; and FIG. 5 is an enlarged horizontal section taken on the line 5—5 of FIG. 3.

Referring to the drawings in detail and in particular to FIGS. 1 and 2, an automotive trunk lid support embodying the present invention is shown as being operatively applied to the lid 10 of the luggage compartment or trunk 12 of an automobile 14 of the passenger type. The automobile 14 is of conventional design and only the rear portion embodying the trunk 12 is illustrated in the accompanying drawings, such illustrated portion including fragmentary parts of the passenger compartment 16, the vehicle body 18, a floor deck 20, a rear axle assembly 22 embodying wheels 24, a fuel tank 26, and a rear bumper 28. As is conventional with most passenger automobiles, the trunk 12 is defined by a portion of the deck 20, in combination with two fender side mounts 30 and 32, and is also defined by the lid 10. The lid is hinged at its front marginal region 34 by means of two laterally offset hinge assemblies 36 which are suitably mounted on the vehicle body 18. A lock and latch assembly (not shown) is carried medially of the distal edge region 40 on the rear deck ledge 44 to secure the lid in its normal or closed position. Other illustrated portions of the automobile 14 appearing herein have not been described inasmuch as they are incidental disclosures having no direct relation to the present trunk lid support.

Referring now specifically to FIG. 2, the trunk lid 10 is substantially planar throughout a major portion of its extent and, in the distal region thereof, it is curved rearwardly and downwardly as at 50 in order to accommodate the curvature of the box-like parts 52 (see FIG. 3) which extend along the inner edges of the usual fender overhang strips 54 of the two aforementioned fender side mounts 30 and 32. These box-like parts are provided on the upper surfaces thereof with the usual rubber or other elastomeric sealing strips 56 which cooperate with the lateral edge regions 58 of the lid 10 when the lid is in its closed position. The lid 10 is movable bodily between the fully open position wherein it is shown in dotted lines in FIG. 2 and a fully closed position wherein it makes sealing contact with the sealing strips 56 and effectively closes the trunk 12.

It is to be noted that when the lid 10 is in its fully open position it extends approximately vertically and the rearward vision of the occupants of the passenger compartment 16 through the rear window 60 is obstructed. Normally, as is the case in connection with most passenger automobiles, the hinge assemblies 36 are such that the lid 10 is biased by a dead-center cam arrangement toward its fully open position so that if the lid is not securely latched or locked in its fully closed position it will eventually swing, under the influence of road shocks and the like, to its fully open position. Therefore, when large or bulky articles are carried in the trunk 12, it is desirable that the lid 10 be closed upon these articles as far as possible in order that the passenger's rear vision shall not be obstructed. In some instances, it is not desirable that the lid be so far closed that it will bear against the articles lest damage thereto by scraping shall take place during movement of the automobile on the road.

Accordingly, the automotive trunk lid support of the present invention is designed to maintain the trunk lid 10 in any selected intermediate position as, for example, the position in which it is shown in full lines in FIG. 2 and the lid, when so maintained, is securely held against swinging movement in either direction about the effective axis of the hinge assemblies 36 to the end that the lid offers a degree of hold-down stability to such oversize objects or articles as are being transported in the trunk 12.

Referring now to FIG. 4, the automotive trunk lid support of the present invention involves in its general organization two identical thrust members 70, a draw-string 86, two identical hook members 88, a draw-string tightener 94 and certain miscellaneous hardware items which will be pointed out presently.

Each of the thrust members 70 is of a composite nature and comprises two identical half-sections which may be formed of wood, plastic, metal or other suitable rigid material and are in the form of elongated rigid bars 72 (see FIGS. 4 and 5). Such bars are maintained in slighlty spaced apart parallel relationship by means of nut and bolt assemblies 74 and spacer collars 76 on the central portions of the shanks of the assemblies 74. The latter are located at the opposite ends of the thrust members 70. The lower ends of the bars 72 are tapered as clearly shown in FIGS. 3 and 4 to provide blunt ends 78. One side edge of each half-section 72 is tapered as best seen in FIG. 5, thus providing a feathered side edge 79.

One side of each thrust member 70 is formed with a longitudinal series of notches 80 which, when the thrust member is in a vertical position, present flat upwardly facing shelf portions or shoulders 82. The latter are adapted selectively to support thereon one side edge 84 of the trunk lid 10 in a manner that will be made clear presently. The draw-string 86 is in the form of a length of flexible cord which is preferably formed of twisted or woven nylon. The hook members 88 are U-shaped and are suitably attached to the ends of the draw-string 86. The latter has directly inwards of the hook members 88 loop portions 90 which extend loosely through the thrust members 70 between the upper and lower nut and bolt assemblies 74. The draw-string also has a connecting portion 92 which extends between and connects the two loop portions 90. The draw-string tightener 94 is in the form of a generally rectangular elongated block and has adjacent to one end thereof a small hole 96 through which the connecting portion 92 of the draw-string passes loosely. Adjacent to the other end of the draw-string tightener are two transversely disposed notches 98 and these are provided for draw-string receiving purposes as will be set forth subsequently. One side margin of the draw-string tightener tapers to a relatively blunt feathered edge 100 as best seen in FIG. 4. The loop portions 90 of the draw-string 86 are prevented from pulling from between the bars 72 of the thrust members 70 by means of seating members in the form of curved annular washers 102 through which the loop portions pass loosely. The washers 102 are designed for seating engagement with a series of shallow recesses 104 which are formed in the outer side portions 70 and are disposed in opposed relation with the notches 80. The curvature of the washers 102 is conformable to the curvature of the recesses 104 in order that the washers will seat snugly in selected recesses in face-to-face contact therewith when the trunk lid support is operatively installed on the automobile as will become clear presently.

In the installation of the present automotive trunk lid support, the trunk lid 10 is first moved to an approximate position (see FIGS. 1 to 3, inclusive) wherein it rests upon the upper portion of the tallest object or article to be transported in the trunk 12. Thereafter, the two thrust members 70 which, in effect, are in the form of slotted bars are positioned at appropriate places on the fender overhang strips 54 with their lower blunt ends 78 resting on these strips and with the two members 70 extending generally in vertical directions. The lid 10 is then lifted so that its side edges 84 will register horizontally with the next adjacent notches 80 to the end that there will be a slight clearance between the upper portion of the tallest article and the trunk lid. Thereafter, the shoulders 82 of said next adjacent notches are slid under the side edges 84 and the trunk lid 10 is thus caused to be supported upon such side edges.

In order securely to clamp the side edges 84 of the trunk lid 10 against the subjacent shoulders 82 and also to draw the two thrust members 70 inwardly against the side edges of the trunk lid 10, the two hook members 88 are first hooked beneath the box-like parts 52. Thereafter, appropriate recesses 104 are selected for reception of the curved washers 102. After the washers have been caused to seat in the selected recesses, the loose connecting portion 92 of the draw-string 86, which had been previously passed over the top of the trunk lid 10 transversely thereof, is tightened by means of the tightener 94 in order to pull the draw-string 86 taut and bind the trunk lid 10 against the two subjacent shoulders 82. With the draw-string 86 thus drawn taut, the two curved washers 112 are drawn inwardly against the selected recesses 104 and the vectorial force that is applied thereto is such that these washers cannot slip from the recesses. The draw-string 86 when tightened draws the two thrust members 70 inwardly toward each other to clamp the trunk lid 10 therebetween and it also serves to apply downward thrust to the members 70 to maintain their lower ends seated upon the overhang strips 54.

In manipulating the tightener 94 to tighten the draw-string 86, the draw-string is wrapped around the block which constitutes the tightener so as to make one or two turns, after which the draw-string is anchored in one of the notches 98, the particular notch selected depending upon whether the turns are left or right hand turns.

Release of the trunk lid for removal of the articles from the trunk 12 is effected by a reversal of the heretofore mentioned installation procedure.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claims is the same to be limited.

Having thus described the invention what I claim as new and desire to secure by Letters Patent is:

1. In an automotive trunk lid support, in combination, two substantially identical elongated thrust members adapted to extend in approximately vertical directions between the overhang strips on the trunk portion of an automobile body and the adjacent sides of the trunk lid with the two members straddling the trunk lid on opposite sides thereof and with their lower ends being supported on the overhang strips, each thrust member being formed with an elongated longitudinally extending slot therein and with a series of longitudinally spaced notches in one side thereof for selective reception therein of one side edge of the trunk lid in supporting relationship, the other side of the thrust member being formed with a series of longitudinally spaced recesses therein, a draw-string for drawing the two thrust members toward each other while at the same time applying downward thrust to the members to maintain their lower ends seated upon the overhang strips, said draw-string having loop portions doubled through the slots in the thrust members and having a connecting portion extending between the loop portions and adapted to overlie the trunk lid, seating members for the draw string selectively receivable in said recesses and adapted to project transversely through the loop portions, hook members secured to the opposite end regions of the draw-string and adapted to be hooked beneath the overhang strips, and draw-string tightening means carried by said connecting portion for taking up slack in the draw-string to tension the same against the trunk lid, the seating members and the overhang strips.

2. In an automotive trunk lid support, the combination set forth in claim 1, wherein said recesses in the thrust members are of arcuate configuration, and wherein said seating members are in the form of annular washers having a cross-sectional curvature conformable to the curvature of the arcuate recesses, the loop portions of the draw-string passing through said washers whereby the latter are captured on the draw-string.

3. In an automotive trunk lid support, the combination set forth in claim 1, wherein said notches in the thrust members present flat shelf portions which extend at a right angle to the longitudinal axes of the thrust members and upon which shelf portions the side edge regions of the trunk lid are adapted to be supported when the draw-string is drawn taut.

4. In an automotive trunk lid support, the combination set forth in claim 1, wherein said notches in the thrust members present flat shelf portions which extend at a right angle to the longitudinal axes of the thrust members and upon which shelf portions the side edge regions of the trunk lid are adapted to be supported when the drawstring is drawn taut, wherein said recesses in the thrust members are of arcuate configuration, and wherein said seating members are in the form of annular washers having a cross-sectional curvature conformable to the curvature of the arcuate recesses, the loop portions of the draw-string passing through said washers whereby the latter are captured on the draw-string.

5. In an automotive trunk lid support, the combination set forth in claim 1, wherein each thrust member includes two identical half-sections each of which is in the form of an elongated rigid bar, spacer members extending between said bars at adjacent ends thereof and serving to maintain the bars in slightly spaced apart and in parallel relationship whereby the opposite ends of the elongated slot in the thrust member are defined by said spacer members.

6. In an automotive trunk lid support, the combination set forth in claim 1, wherein said draw string tightening means is in the form of an elongated generally flat block having a hole formed in one end thereof through which the connecting portion of the draw string loosely extends, and a draw-string receiving notch formed in one side edge of said block adjacent the other end thereof.

References Cited by the Examiner

UNITED STATES PATENTS

| | | | |
|---|---|---|---|
| 1,394,253 | 10/1921 | Dahlgren | 292—265 |
| 2,916,902 | 12/1959 | Wamsley | 296—76 X |
| 2,919,916 | 1/1960 | Miener | 296—76 X |
| 2,973,217 | 2/1961 | Gregoire | 296—76 X |
| 3,216,605 | 11/1965 | Hughes | 217—61 |

MILTON BUCHLER *Primary Examiner.*

J. H. BRANNEN, *Assistant Examiner.*